(12) United States Patent
Garcia

(10) Patent No.: US 10,389,398 B1
(45) Date of Patent: Aug. 20, 2019

(54) FOLIO BOOST FOR TABLET DEVICE

(71) Applicant: Dennis Garcia, Riva, MD (US)

(72) Inventor: Dennis Garcia, Riva, MD (US)

( * ) Notice: Subject to any disclaimer, the term of this patent is extended or adjusted under 35 U.S.C. 154(b) by 0 days.

(21) Appl. No.: 15/530,495

(22) Filed: Jan. 23, 2017

(51) Int. Cl.
- *H04B 1/3888* (2015.01)
- *F16M 11/38* (2006.01)
- *A45C 11/00* (2006.01)
- *A45C 13/00* (2006.01)

(52) U.S. Cl.
CPC ............ *H04B 1/3888* (2013.01); *A45C 11/00* (2013.01); *A45C 13/005* (2013.01); *F16M 11/38* (2013.01); *A45C 2011/003* (2013.01); *A45C 2200/15* (2013.01)

(58) Field of Classification Search
CPC ...................................................... H04B 1/3888
See application file for complete search history.

(56) References Cited

U.S. PATENT DOCUMENTS

| | | | | |
|---|---|---|---|---|
| 8,281,924 B2 * | 10/2012 | Westrup | ............... | A45C 3/02 206/320 |
| 8,432,124 B2 * | 4/2013 | Foster | ............... | A45C 11/00 320/101 |
| 8,730,669 B2 * | 5/2014 | Locker | ............... | G06F 1/1615 345/169 |
| 8,746,449 B2 * | 6/2014 | Gallagher | ............ | F16M 11/105 206/320 |
| 8,780,535 B2 * | 7/2014 | Mongan | ................ | A45C 11/00 206/232 |
| 8,800,937 B1 * | 8/2014 | Lee | ....................... | F16M 11/10 248/65 |
| 9,095,194 B2 * | 8/2015 | Hassett | .................. | A45C 11/00 |
| 9,170,611 B2 * | 10/2015 | Gallagher | ............ | F16M 11/105 |
| 9,274,556 B2 * | 3/2016 | Gallouzi | .............. | F16M 11/041 |
| 9,417,662 B1 * | 8/2016 | Feng | ...................... | G06F 1/1656 |
| 9,470,356 B1 * | 10/2016 | Zaloom | ................. | F16M 11/12 |
| 9,591,905 B2 * | 3/2017 | Poon | ..................... | F16M 13/00 |
| 9,603,425 B2 * | 3/2017 | Diebel | .................. | A45C 11/00 |
| 9,642,425 B2 * | 5/2017 | Tseng | .................... | A45C 11/00 |
| 2004/0150628 A1 * | 8/2004 | Huang | ..................... | A45C 3/02 345/173 |
| 2008/0037213 A1 * | 2/2008 | Haren | ................... | G06F 1/1632 361/679.46 |
| 2010/0101975 A1 * | 4/2010 | Zhang | .................... | A45C 11/00 206/701 |
| 2010/0122924 A1 * | 5/2010 | Andrews | .................. | A45C 9/00 206/320 |
| 2011/0170252 A1 * | 7/2011 | Jones | .................... | G06F 1/1632 361/679.09 |
| 2011/0266194 A1 * | 11/2011 | Bau | ........................ | A45C 11/00 206/736 |
| 2011/0290687 A1 * | 12/2011 | Han | ........................ | A45C 3/02 206/320 |
| 2011/0297564 A1 * | 12/2011 | Kim | ........................ | A45C 11/00 206/320 |

(Continued)

*Primary Examiner* — Cindy Trandai

(57) ABSTRACT

A collapsible support stand for a tablet computing device, comprising: a bottom plate, a back plate, and a forward plate, wherein in the bottom plate is connected to the back plate in a first hinged relationship, and the back plate is also connected to the forward plate in a second hinged relationship, defining a volume of space having a triangular profile, wherein the forward plate provides a contact surface for supporting a tablet computing device in a viewable orientation.

12 Claims, 9 Drawing Sheets

(56) References Cited

U.S. PATENT DOCUMENTS

| | | | | |
|---|---|---|---|---|
| 2012/0012483 A1* | 1/2012 | Fan | ............... | F16M 11/105 206/320 |
| 2012/0153116 A1* | 6/2012 | Harrison | ............... | A47B 23/044 248/460 |
| 2012/0261304 A1* | 10/2012 | Busri | ............... | A45C 11/00 206/736 |
| 2012/0293953 A1* | 11/2012 | Wu | ............... | F16M 11/10 361/679.56 |
| 2013/0016467 A1* | 1/2013 | Ku | ............... | F16M 11/10 361/679.08 |
| 2013/0048514 A1* | 2/2013 | Corcoran | ............... | A45C 3/02 206/45.23 |
| 2013/0098782 A1* | 4/2013 | Diebel | ............... | A45C 11/00 206/45.25 |
| 2013/0119225 A1* | 5/2013 | Lau | ............... | G06F 1/1632 248/634 |
| 2013/0140203 A1* | 6/2013 | Chiang | ............... | G06F 1/1628 206/320 |
| 2013/0213838 A1* | 8/2013 | Tsai | ............... | G06F 1/1633 206/320 |
| 2013/0264459 A1* | 10/2013 | McCosh | ............... | G06F 1/1626 248/688 |
| 2013/0313142 A1* | 11/2013 | Wen | ............... | A45C 11/00 206/320 |
| 2013/0341233 A1* | 12/2013 | Dow | ............... | G06F 1/1603 206/521 |
| 2014/0197048 A1* | 7/2014 | Napolitano | ............... | H05K 5/0226 206/45.2 |
| 2014/0224676 A1* | 8/2014 | Ashley | ............... | A45C 11/00 206/37 |
| 2014/0326840 A1* | 11/2014 | King | ............... | H02J 7/355 248/125.7 |
| 2015/0001105 A1* | 1/2015 | Nyholm | ............... | A45C 11/00 206/45.2 |
| 2015/0280768 A1* | 10/2015 | Huang | ............... | H04B 1/3888 455/575.8 |
| 2016/0088750 A1* | 3/2016 | Wu | ............... | F16M 11/10 |

* cited by examiner

FOLIO BOOST FOR TABLET DEVICE

FIELD OF THE INVENTION

The present invention relates broadly to computing devices, and more specifically to presenting a table computing device to a user.

BACKGROUND OF THE INVENTION

The proliferation of wireless Internet access and portable computing devices has made portable computing far easier than ever before. A portable computing device, such as a notebook computer or tablet computer, and collectively referred to herein as a "tablet," presents to a user a viewing screen that is larger than that of a smart phone and thus more useful than smart phones for a variety of applications. Tablets are flat, relative thin and lightweight, and are often placed inside of a protective folio that provides a hinged cover that protects the screen from scratches and impact when not in use. But with the portability of tablet comes the problem of hands-free operation. While a user no longer is tied to a desk and chair such as with earlier, conventional desktop computers, a tablet is often held in the user's hands, placed on their lap, or somehow propped upright so that the user can view the screen in a hands-free application. While there are various stands available, nearly all of these require the user to remove the tablet from the folio and place it on the stand. Folios are delicate in nature, often comprising a thin plastic covering, and constantly removing the tablet from the folio and replacing it within the folio quickly damages the folio and makes it unusable. The tablet then is unprotected and can easily sustain damage in the form of a scratched or fractured screen that is expensive to repair.

SUMMARY OF THE INVENTION

The present invention solves the problems described above by providing a portable, collapsible stand that retains an unfolded folio to present the tablet contained therein to a user without having to remove the tablet from the folio. In one aspect, the present invention includes a bottom plate, a back plate, and a forward plate, wherein in the bottom plate is connected to the back plate in a first hinged relationship, and the back plate is also connected to the forward plate in a second hinged relationship, defining a volume of space having a triangular profile, wherein the forward plate provides a contact surface for supporting a tablet computing device in a viewable orientation. In an embodiment, the back plate includes a retaining strap sufficiently dimensioned to retain a portion of a tablet folio, the tablet folio being a foldable cover unfolded to reveal the tablet computing device. In an embodiment, the forward plate includes a plurality of support shelves sufficiently dimensioned to support the tablet computing device. In an embodiment, the shelves have varying depths. In an embodiment, the shelves include a bottom shelf, a middle shelf, and a top shelf, wherein the bottom shelf is deeper than the middle shelf, and the middle shelf is deeper than the top shelf. In an embodiment, there is also included a rotator, the rotator affixed to the bottom surface of the bottom plate. In an embodiment, there is included a carrying case attached to the bottom surface of the bottom plate, and including a compartment in sufficiently dimensioned to store the tablet computing device when not in use. In an embodiment, the bottom plate includes a retaining lip on the top surface of the bottom plate spanning the width of the bottom plate at the forward edge of the bottom plate.

Many other features and advantages of the present invention will become apparent to those skilled in the art upon reading the following description, when considered in conjunction with the accompanying drawings, in which:

DETAILED DESCRIPTION

Figure 1:
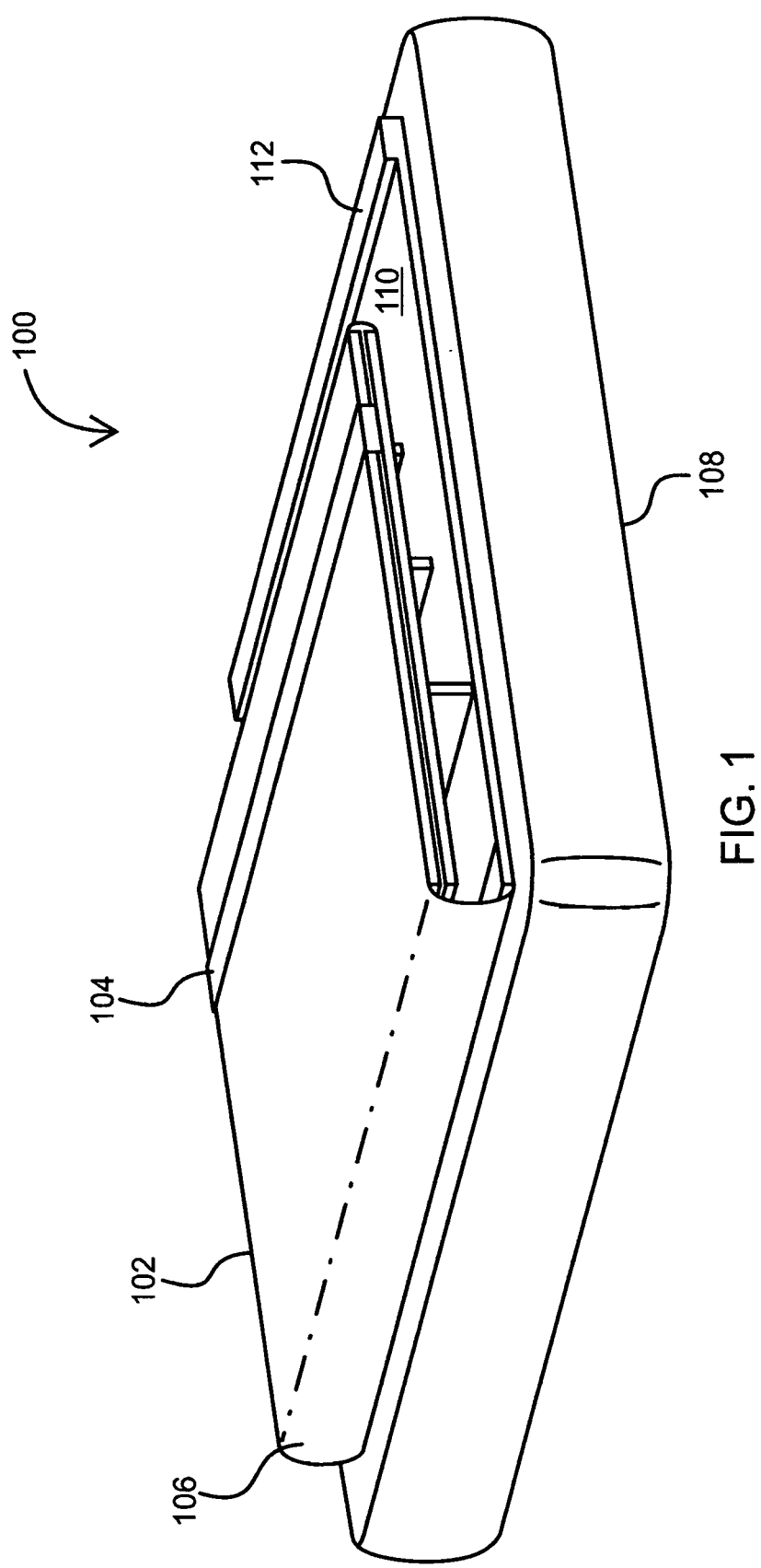
FIG. 1 shows a perspective view of the folio boost of the present invention in a folded-up configuration.

Directing attention generally to FIGS. 1-9, there is shown folio boost 100 in various configurations and orientations. Folio boost 100 is a foldable stand having back plate 102 on which retaining strap 104 is located, and hinge 106 connecting back plate 102 to bottom plate 110. In an embodiment, folio boost 100 is attached to protective carrying case 108 that is sufficiently dimensioned to contain a tablet and its protective folio when not in use, and also serves as a stable surface that supports folio boost 100 when a tablet is placed thereon. In an embodiment, bottom plate includes retaining lip 112. FIGS. 2A and 2B show folio boost 100 in a completely unfolded orientation apart from carrying case 108. FIG. 2A shows a plan view of folio boost 100 when viewed from above. Forward plate 116 is connected to rear plate 102 by hinge 114. Retaining strap 104 secures to rear plate 102 on the right and left edges of rear plate 102 and spans the width of rear plate 102 on the opposite side, as shown in FIG. 2B. Rear plate 102 is connected to bottom plate 110 by hinge 106. Bottom plate 110 incorporates retaining lip 112 at its bottom edge.

Figure 2B:
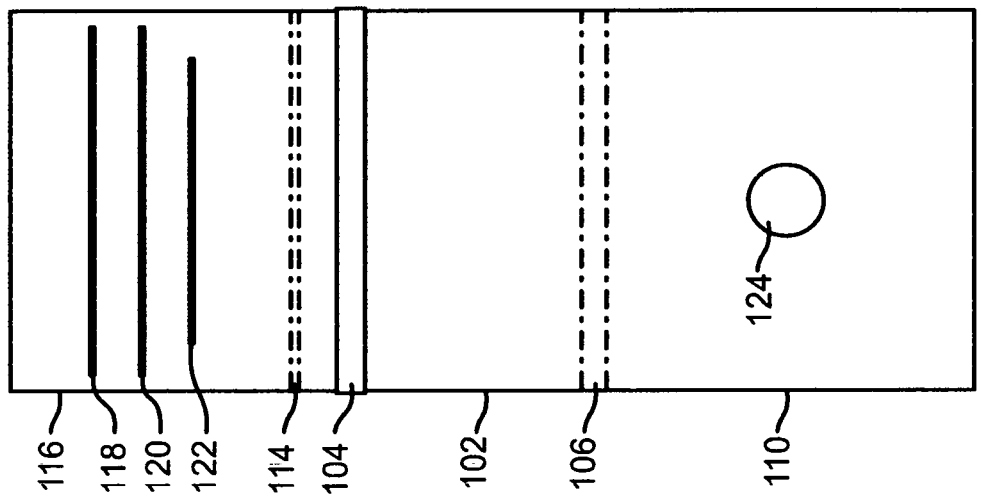
FIG. 2B shows a plan view of the folio boost as viewed from below.
Figure 2A:
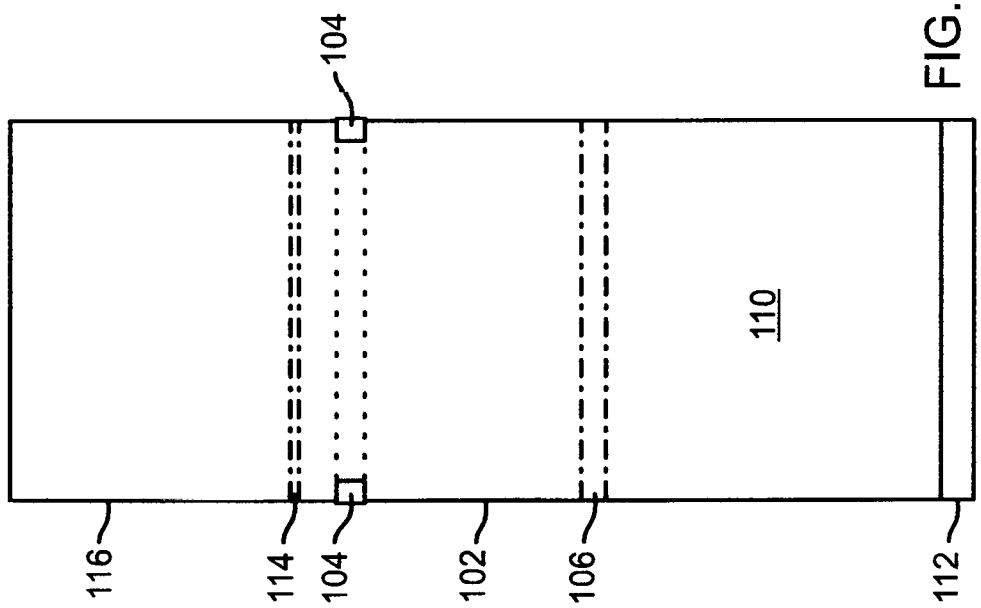
FIG. 2A shows a plan view of the folio boost as viewed from above.

Directing attention to FIG. 2B, forward plate 116, in an embodiment, includes a plurality of support shelves upon which a tablet is supported in various orientations. As shown in FIG. 2B, there is bottom shelf 118, middle shelf 120, and top shelf 122. Also shown in FIG. 2B is rotator 124 presented in the center of bottom plate 110, which allows bottom plate 110 to rotate to a desired angle when placed on carrying case 108.

Figure 3:
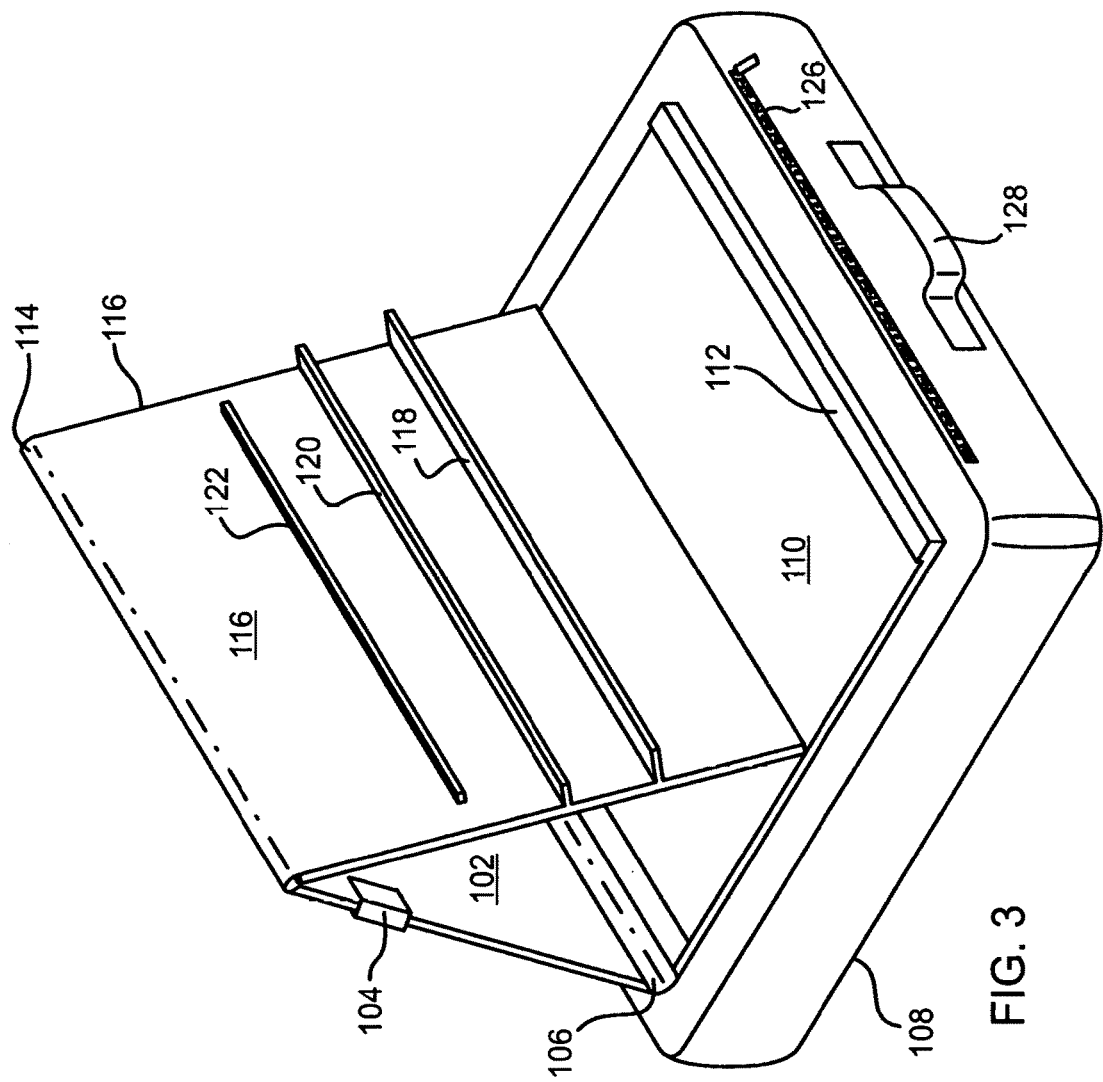
FIG. 3 shows a perspective view of the folio boost when assembled into an orientation that is ready for a tablet and folio to be placed thereon.

FIG. 3 shows a perspective view of folio boost 100 placed in a ready-to-use orientation. As shown in FIG. 3, when placed in this orientation, rear plate 102, bottom plate 110 and forward plate 116 define a volume of space characterized by a triangular profile as viewed from the side. Also as shown, in an embodiment, the plurality of support shelves 118, 120, and 122 have varying depths. This is to provide clearance for a tablet to be placed on any of the support shelves. For example, bottom shelf 118 is the deeper than middle shelf 120, which is deeper than top shelf 122. Also shown in FIG. 3 is zipper 126, which opens to allow a tablet to be stored between sheets of protective foam inside of carrying case 108, and handle 128 for carrying the tablet and folio boost 100 when not in use.

Figure 4:
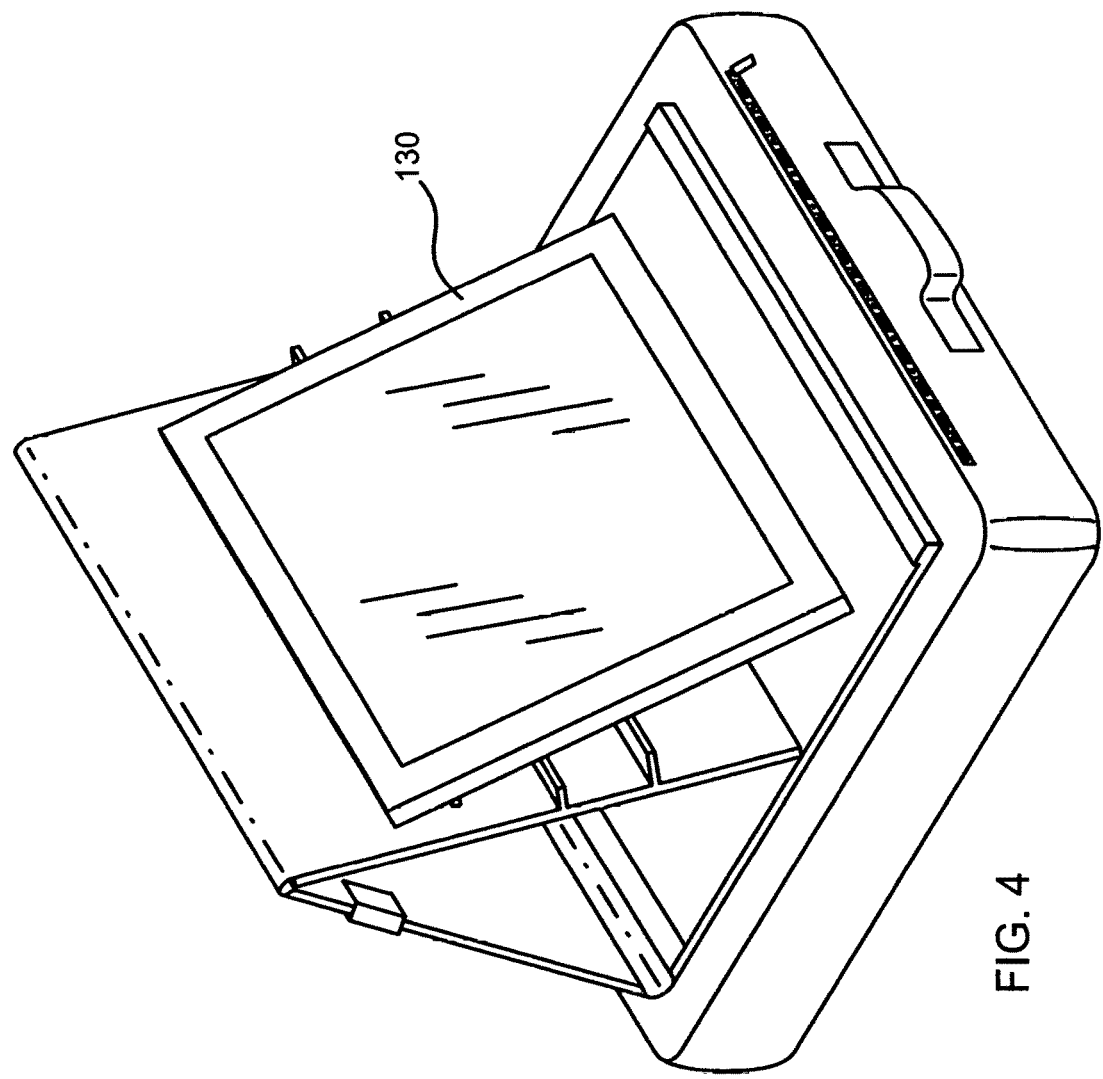
FIG. 4 shows a perspective view of the folio boost with a tablet placed thereon.

While support shelves 118, 120 and 122 are provided, folio boost 100 can still support a tablet without a folio, as shown in FIG. 4. In another embodiment not shown, folio boost 100 can be provided without support shelves 118, 120 and 122, with forward plate 116 presenting a flat surface. In such an embodiment, tablet 130 can be secured to forward plate 116 in a semi-permanent arrangement, either by adhesive, fasteners, and the like.

Figure 5:
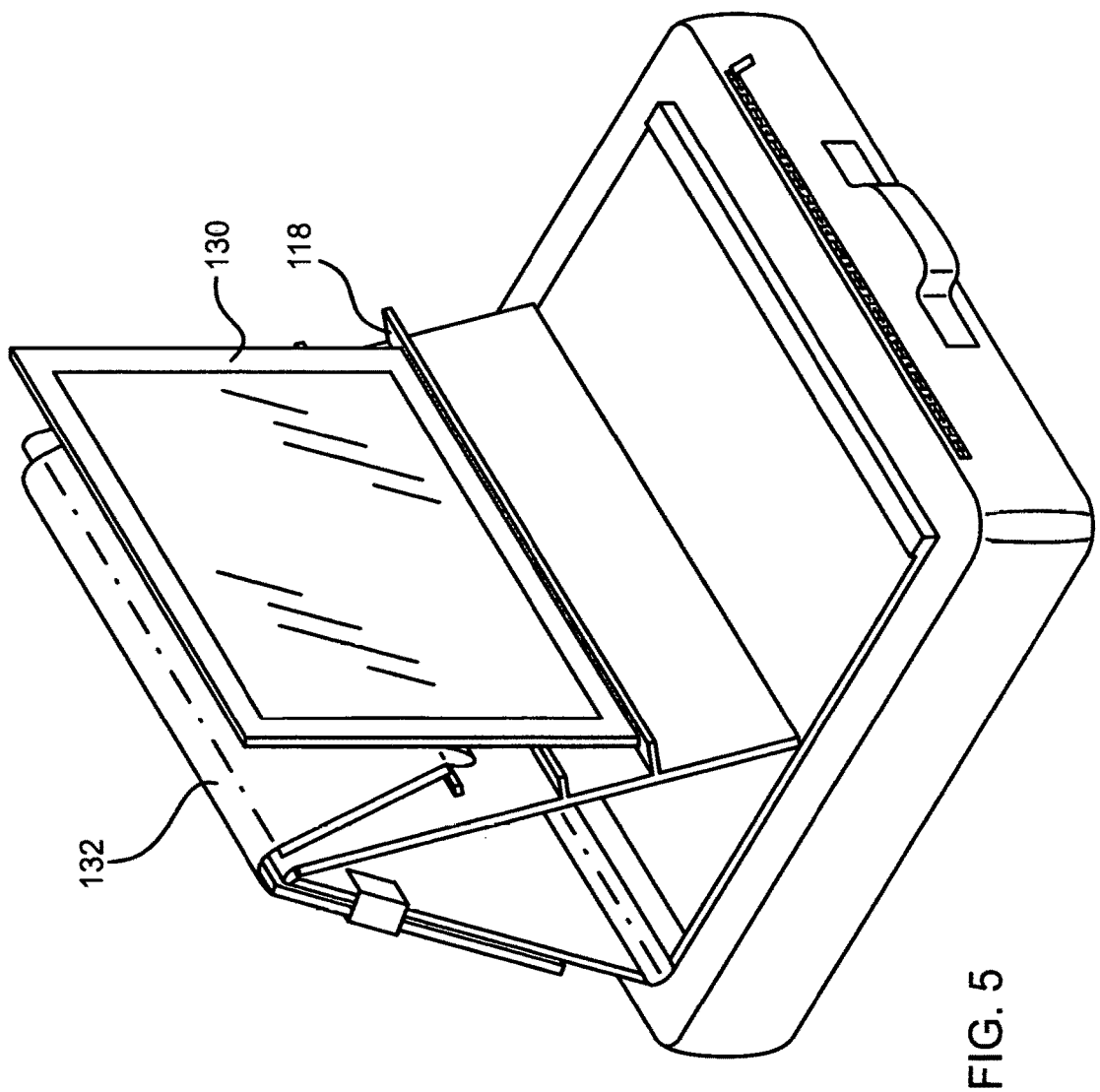
FIG. 5 shows a perspective view of the folio boost with a tablet with a folio placed thereon and retained in a viewing orientation.
Figure 6:
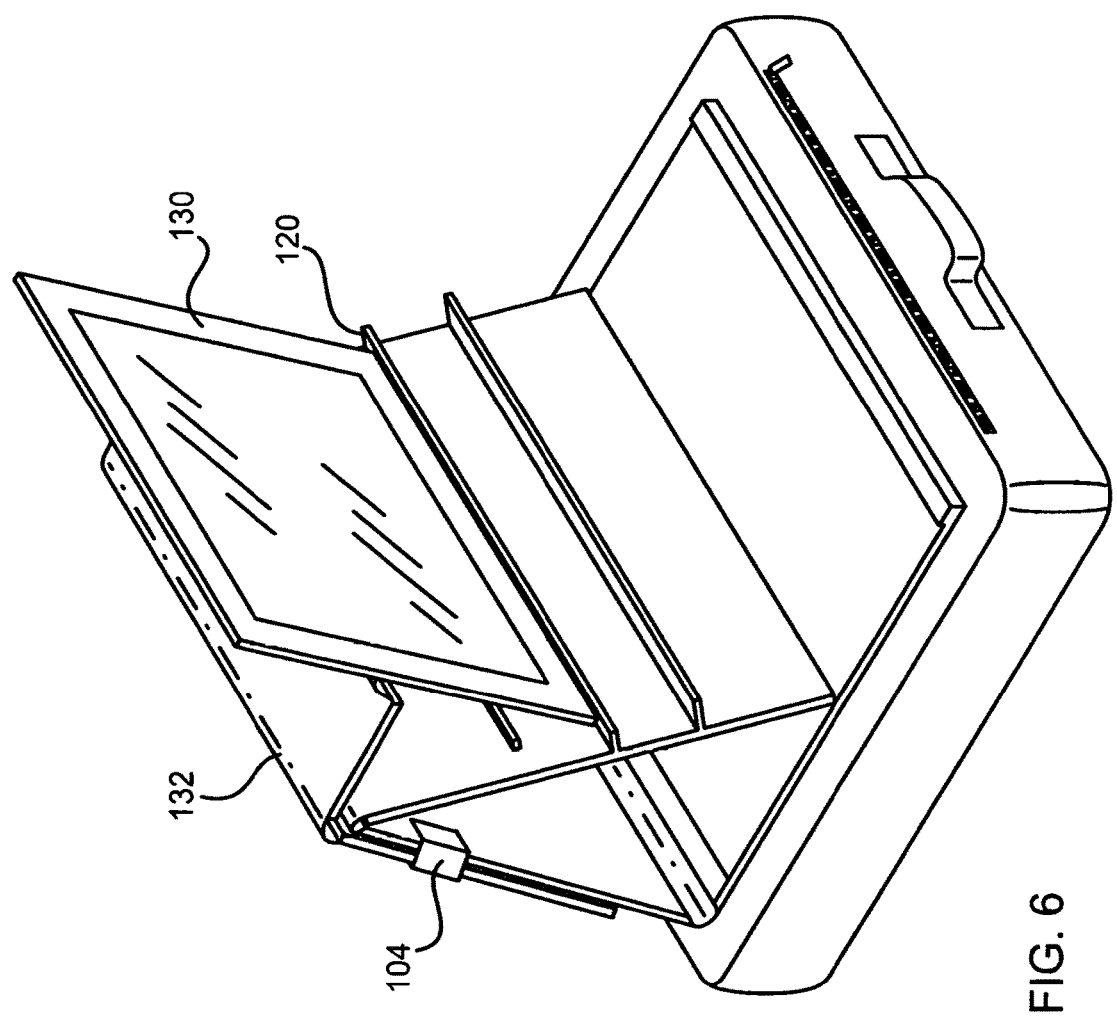
FIG. 6 shows a perspective view of the folio boost with the tablet retained by its folio in an alternative viewing orientation.

FIG. 5 shows tablet 130 with protective folio 132 unfolded and placed over the top of folio boost 100 and secured on back plate 102 by insertion through retaining strap 104. As shown, tablet 130 is supported by bottom shelf 118. FIG. 6 shows tablet 130 placed on middle shelf 120, again with folio 132 retained by retaining strap 104. While not shown, a slightly different orientation exists when tablet 130 is placed on top shelf 122.

Figure 7:
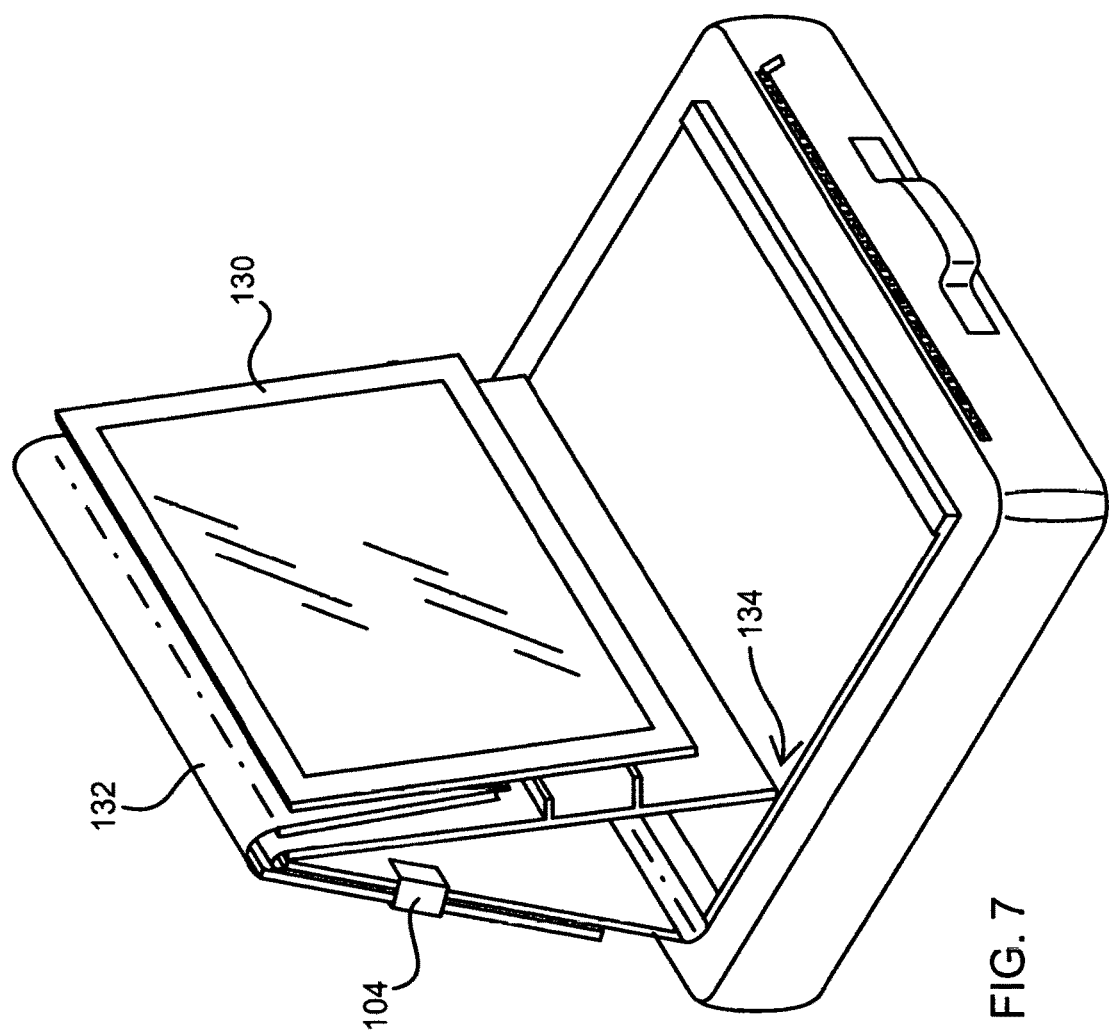
FIG. 7 shows a perspective view of the folio boost with the tablet retained by its folio in yet another alternative viewing orientation.
Figure 8:
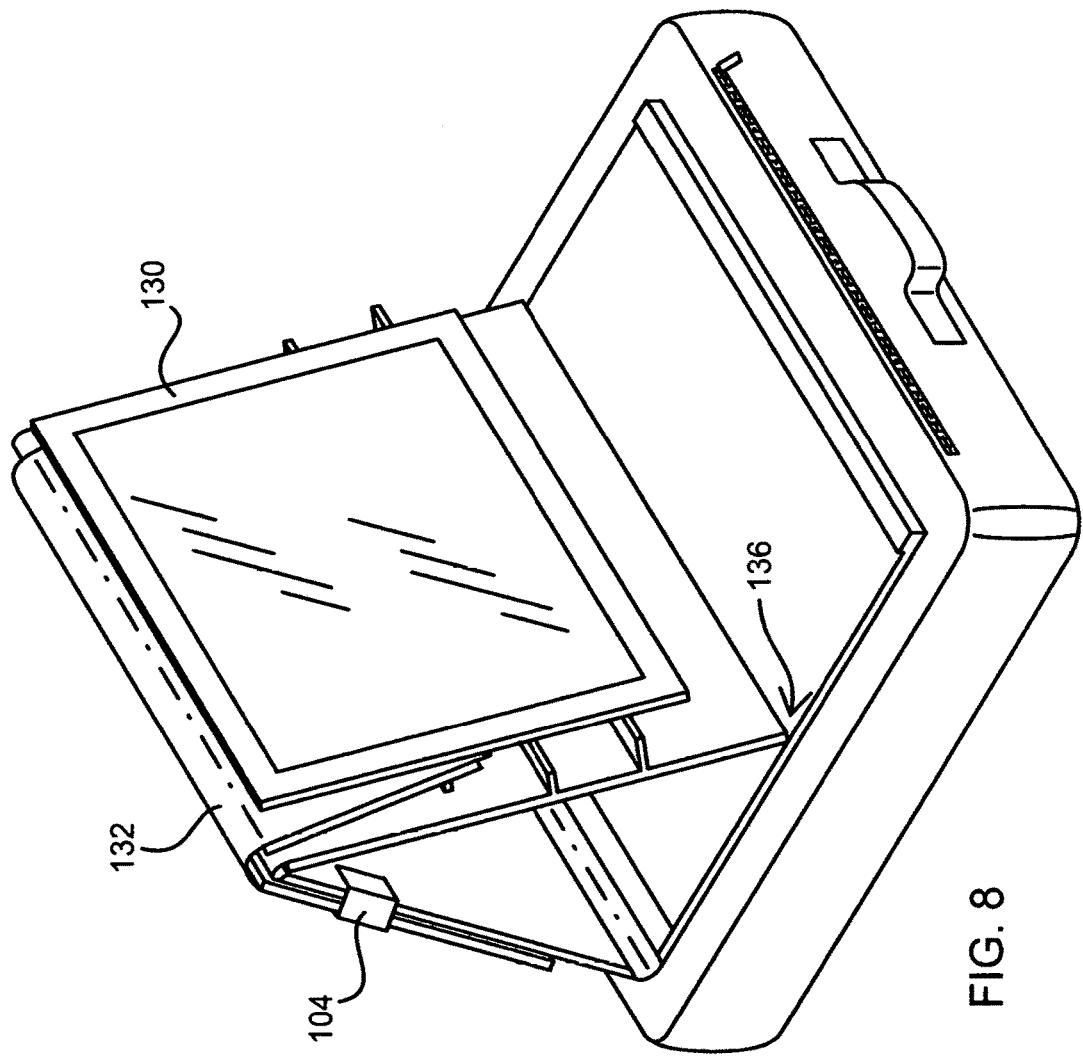
FIG. 8 shows a perspective view of the folio boost with the tablet retained by its folio in yet another alternative viewing orientation.
Figure 9:
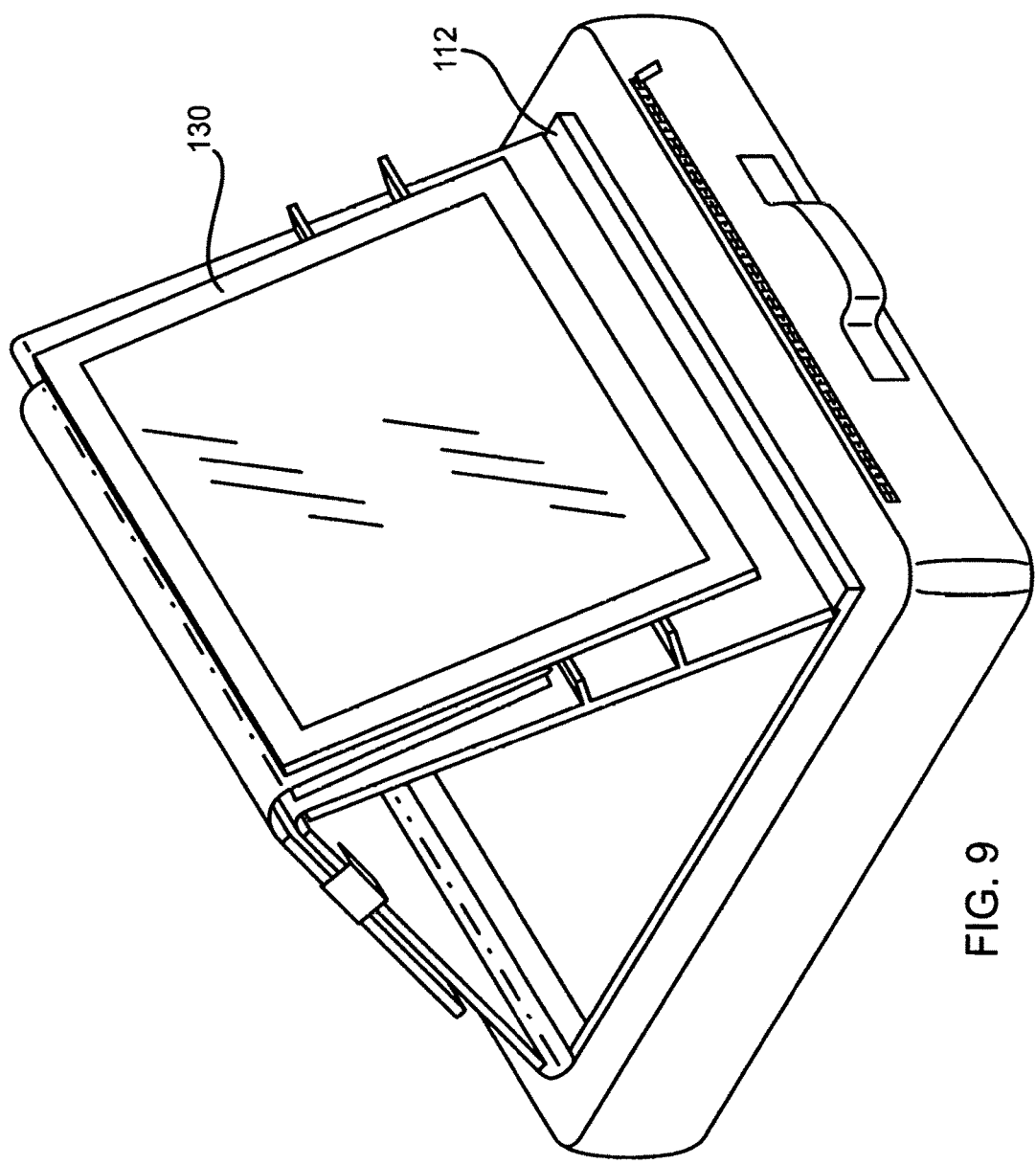
FIG. 9 shows a perspective view of the folio boost with the tablet retained by its folio with the forward plate of the folio boost placed against its retaining lip.

It is to be understood that folio boost 100 is constructed from materials that have a sufficient coefficient of static friction that forward plate 116 does not slip across the surface of bottom plate 110 when supporting tablet 130. Thus, forward plate 116 can be deployed at varying angles to adjust the display for optimal viewing. For example, FIG. 7 shows an orientation where forward plate makes contact with bottom plate 110 at contact point 134, which is a more vertical orientation than shown in FIG. 8, where forward plate 116 makes contact with bottom plate 110 at contact point 136. FIG. 9 shows an even more reclined orientation of forward plate 116, with contact made with bottom plate 110 when the bottom edge of forward plate 116 is brought into contact with retaining lip 112.

While the preferred embodiment and multiple alternative embodiments have been described and illustrated in detail, it is to be understood that numerous modifications can be made to the embodiments of the present invention without departing from the spirit thereof.

What is claimed is:

1. A collapsible support stand for a tablet computing device, the collapsible support stand comprising:
   a bottom plate,
   a back plate, and
   a forward plate,
   wherein the bottom plate is connected to the back plate in a first hinged relationship, and the back plate is also connected to the forward plate in a second hinged relationship, defining a volume of space having a triangular profile, wherein the forward plate provides a contact surface for supporting a tablet computing device in a viewable orientation, and wherein the collapsible support stand further comprises a rotator, the rotator being affixed to the bottom surface of the bottom plate.

2. The collapsible support stand of claim 1, wherein the back plate includes a retaining strap sufficiently dimensioned to retain a portion of a tablet folio, the tablet folio being a foldable cover unfolded to reveal the tablet computing device.

3. The collapsible support stand of claim 1, wherein the forward plate includes a plurality of support shelves sufficiently dimensioned to support the tablet computing device.

4. The collapsible support stand of claim 3, wherein the plurality of shelves have varying depths.

5. The collapsible support stand of claim 4, wherein the plurality of shelves include a bottom shelf, a middle shelf, and a top shelf, wherein the bottom shelf is deeper than the middle shelf, and the middle shelf is deeper than the top shelf.

6. The collapsible support stand of claim 1, further including a carrying case, the carrying case attached to the bottom surface of the bottom plate, and including a compartment sufficiently dimensioned to store the tablet computing device when not in use.

7. The collapsible support stand of claim 1, wherein the bottom plate includes a retaining lip on the top surface of the bottom plate spanning the width of the bottom plate at the forward edge of the bottom plate.

8. A collapsible support stand for a tablet computing device in a foldable folio, the collapsible support stand comprising:
   a bottom plate,
   a back plate, and
   a forward plate having a top end and a bottom end,
   wherein the bottom plate is connected to the back plate in a first hinged relationship, and the back plate is connected to the forward plate at the forward plate top end in a second hinged relationship, defining a volume of space having a triangular profile, wherein the forward plate provides a contact surface for supporting a tablet computing device in a viewable orientation, wherein the back plate has a rear face and a restraining strap on its rear face, and wherein the restraining strap is adapted to receive a portion of an unfolded folio containing the tablet while the tablet is positioned on the forward plate.

9. The collapsible support stand of claim 8, wherein the second hinged relationship allows the forward plate and back plate to open relative to one another and lie flat.

10. The collapsible support stand of claim 8, wherein the forward plate includes one or more support shelves dimensioned to support the tablet computing device whereby the position of the tablet computing device on the forward plate is adjustable, and wherein the one or more support shelves are configured so that tablet computing device on the support shelf may be tilted forward relative to the forward plate.

11. A collapsible support stand for a tablet computing device, the collapsible support stand comprising:
   a bottom plate,
   a back plate, and
   a forward plate,
   wherein the bottom plate is connected to the back plate in a first hinged relationship, and the back plate is also connected to the forward plate in a second hinged relationship, defining a volume of space having a triangular profile, wherein the forward plate provides a contact surface for supporting a tablet computing device in a viewable orientation, wherein the forward plate includes one or more support shelves dimensioned to support the tablet computing device whereby the position of the tablet computing device on the forward plate is adjustable, and wherein the one or more support shelves are configured so that tablet computing device on the support shelf may be tilted forward relative to the forward plate.

12. The collapsible support stand of claim 11, wherein the forward plate includes a plurality of support shelves.

\* \* \* \* \*